(12) United States Patent
Jones

(10) Patent No.: US 6,698,909 B2
(45) Date of Patent: *Mar. 2, 2004

(54) NON-GLARING, AESTHETICALLY PLEASING LIGHTING FIXTURES

(75) Inventor: Peter J. Jones, Belmont, MA (US)

(73) Assignee: Tenebraex Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/866,455

(22) Filed: May 28, 2001

(65) Prior Publication Data

US 2002/0080602 A1 Jun. 27, 2002

Related U.S. Application Data

(63) Continuation of application No. 09/207,743, filed on Dec. 8, 1998, now Pat. No. 6,238,065.
(60) Provisional application No. 60/019,530, filed on Jun. 10, 1996.

(51) Int. Cl.[7] .................................................. F21V 5/04
(52) U.S. Cl. ........................ 362/339; 362/148; 362/224; 362/354
(58) Field of Search ................................ 362/148, 339, 362/142, 222, 224, 279, 290, 351, 354, 355

(56) References Cited

U.S. PATENT DOCUMENTS 2,223,841 A  * 12/1940 Biller .......................... 362/339
3,265,887 A  * 8/1966 Wince ......................... 362/223
6,238,065 B1 * 5/2001 Jones .......................... 362/148

* cited by examiner

Primary Examiner—Alan Cariaso
Assistant Examiner—Ismael Negron
(74) Attorney, Agent, or Firm—Edwards & Angell, LLP; Peter F. Corless; Lisa Swiszcz Hazzard

(57) ABSTRACT

The invention provides in preferred aspects architectural lighting structures that comprise a plurality of tubular elements at least partially embedded into an at least substantially transparent lens structure of a lighting fixture. The lighting fixture is typically a device employed for interior use, particularly residential buildings or commercial buildings such as office buildings. By partially embedding the array or plurality of tubular elements into the transparent lens structure, the fixture can appear as if it is substantially a part of the surrounding surface when the lighting fixture is turned off. Nevertheless, when the light is turned on, light coming from the fixture can still be directed or modified in an appropriate manner, e.g. without detrimental light output reductions), and without the need of an expensive, sophisticated reflector or any necessity of the fixture extending beyond the surrounding surface as has been utilized in certain prior attempts to mask architectural lighting fixtures. Still further, while the light fixture is turned on, an unsightly bulb or glaring reflector can be masked from a viewer's eye as a result of the partially embedded tubular elements.

9 Claims, 11 Drawing Sheets

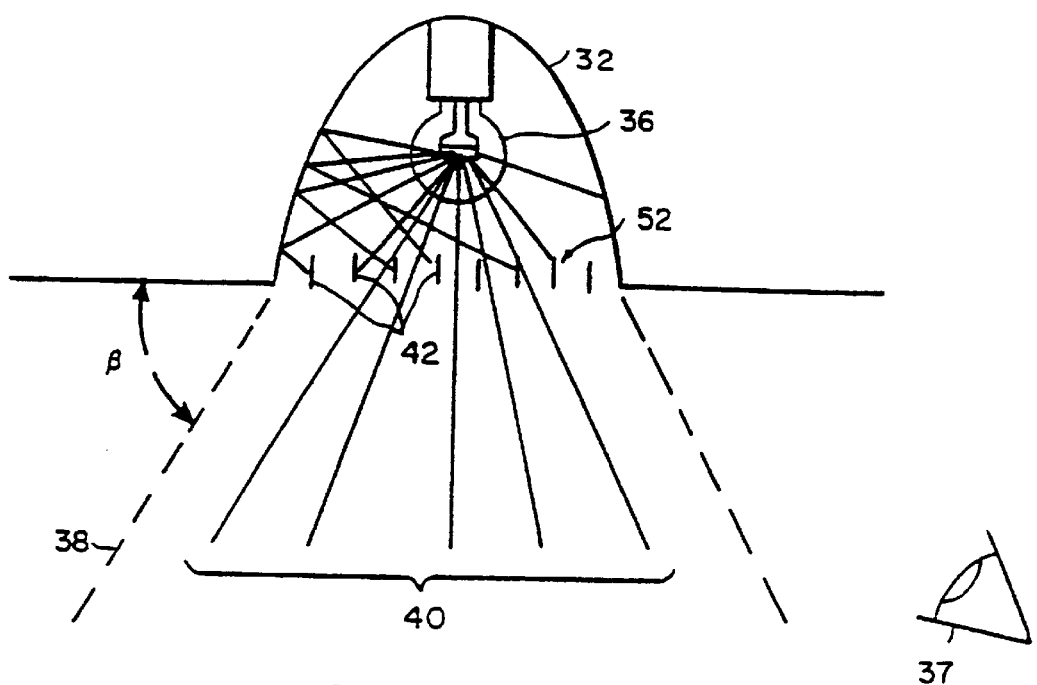
FIG. 4 PRIOR ART
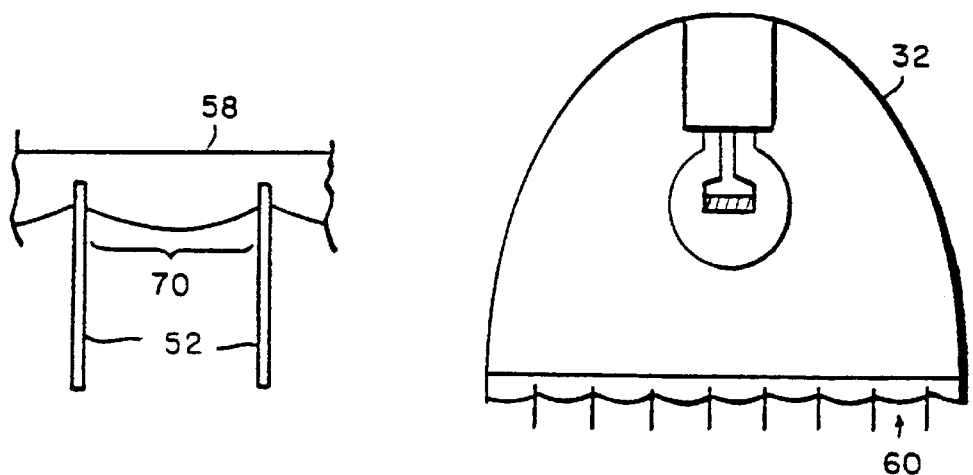
FIG. 6
FIG. 7

NON-GLARING, AESTHETICALLY PLEASING LIGHTING FIXTURES

This appln is a continuation of Ser. No. 09/207,743 filed Dec. 8, 1998, now U.S. Pat. No. 6,238,065 which claims benefit of Prov. No. 60/019,530 filed Jun. 10, 1996.

This invention relates generally to techniques for concentrating or directing the output from lighting fixtures and modifying the fixtures' appearance in the off and/or the on state.

BACKGROUND OF THE INVENTION

Lighting fixtures, e.g. the recessed "can lights" used in architectural lighting, have traditionally used a variety of techniques to efficiently direct or otherwise manipulate their light output. For example, the fixtures may be designed to be recessed into a wall or ceiling, may incorporate reflectors or lenses or may incorporate baffles or shields.

However, manipulation of the light output or increase efficiency often comes at the price of a less pleasing appearance when the lighting fixture is turned off or on. Recessed "can lights" for example, look like holes in the ceiling plane when they are off; "wall washer" fixtures, i.e. fixtures set into a ceiling and configured to throw light onto an adjacent wall, often project below the surface of the ceiling and are often of low efficiency; reflectors used to direct light downwards can create glare to a viewer's eye.

The problem of unattractive lighting fixtures has become worse with the advent of high-efficiency, compact fluorescent bulbs replacing simple incandescent bulbs in many lighting fixtures. These compact fluorescent bulbs, with their large, twisted glass tubes, are unpleasing to the eyes, and since they are much less of a point source than incandescent bulbs, do not lend themselves to simple, efficient reflector design.

At present, the practical solutions to the above problems are limited. For example, certain grids of vanes have been placed in front of the light source to shield a viewer's eyes from glare coming from the bulb or its reflector or to make a light look like less of a hole in the ceiling. Sophisticated and precisely shaped reflectors can be incorporated into a compact fluorescent lamp's fixture to try to direct light from the bulb efficiently in the desired pattern. PAR-type lamps can be mounted at an angle inside a recessed fixture to wash a wall with light without a bulb or fixture hanging below the plane of the ceiling.

Those approaches each suffer from significant disadvantages. Current grids of shielding vanes can reduce the efficiency or restrict the angle of illumination of a fixture. Sophisticated and precisely shaped reflectors are expensive to manufacture. PAR-type lamps are substantially more expensive than standard-type bulbs.

Accordingly, it would be highly desirable to have other techniques to manage the light output from a lighting fixture as well as provide an aesthetically pleasing appearance when the fixture is in the either on or off state.

SUMMARY OF THE INVENTION

The invention provides a lighting structure that comprises a plurality of tubular elements at least partially embedded into an at least substantially transparent lens structure of a lighting fixture. The lighting fixture is typically a device employed for interior use, particularly interior commercial or residential buildings. The lens structure may be of any of a number of materials that are employed to disperse or enhance light produced by and/or shield the light producing element(s) of the lighting fixture. For example, the lens structure may be a standard lens element, or may contain a plurality of lens-like or other light modifying elements positioned at the front of a lighting fixture. The lens or lens-like elements direct light coming from the fixture's light source and reflector outward through the tubular elements.

By partially embedding the array or plurality of tubular elements into the transparent lens structure, the fixture can appear as if it is substantially a part of the surrounding surface when the lighting fixture is turned off (i.e. light bulb or other light producing elements not emitting light). Nevertheless, when the light is turned on (i.e. light bulb or other light producing elements emitting light) light coming from the fixture can still be directed or modified in an appropriate manner, e.g. without detrimental light output reductions), and without the need of an expensive, sophisticated reflector or any necessity of the fixture extending beyond the surrounding surface as has been utilized in certain prior attempts to mask architectural lighting fixtures. Still further, while the light fixture is turned on, an unsightly bulb or glaring reflector can be masked from a viewer's eye as a result of the partially embedded tubular elements.

The invention also includes methods for manufacturing lighting devices of the invention. Those methods comprise in general steps of heating a lens material to at least its glass transition temperature; at least partially embedding an array of tubular elements into the heated lens material; and cooling the lens material with tubular elements embedded therein whereby lens elements form around and/or between the tubular elements.

Other aspects of the invention are disclosed infra.

BRIEF DESCRIPTION OF THE DRAWINGS

FIG. 4 depicts diagrammatically the geometry of a typical situation in which a grid of tubes installed in front part of a lighting fixture to shield an observer from glare can also reduce the output of the fixture and restrict its angle of illuminating;

FIG. 6 diagrammatically illustrates a section through the embodiment of FIG. 5 and is useful in explaining the concept of embedding a grid of tubes into a lens structure;

FIG. 7 diagrammatically illustrates how the structure in accordance with the invention is placed in front of a lighting fixture;

DETAILED DESCRIPTION OF THE INVENTION

Figure 1:
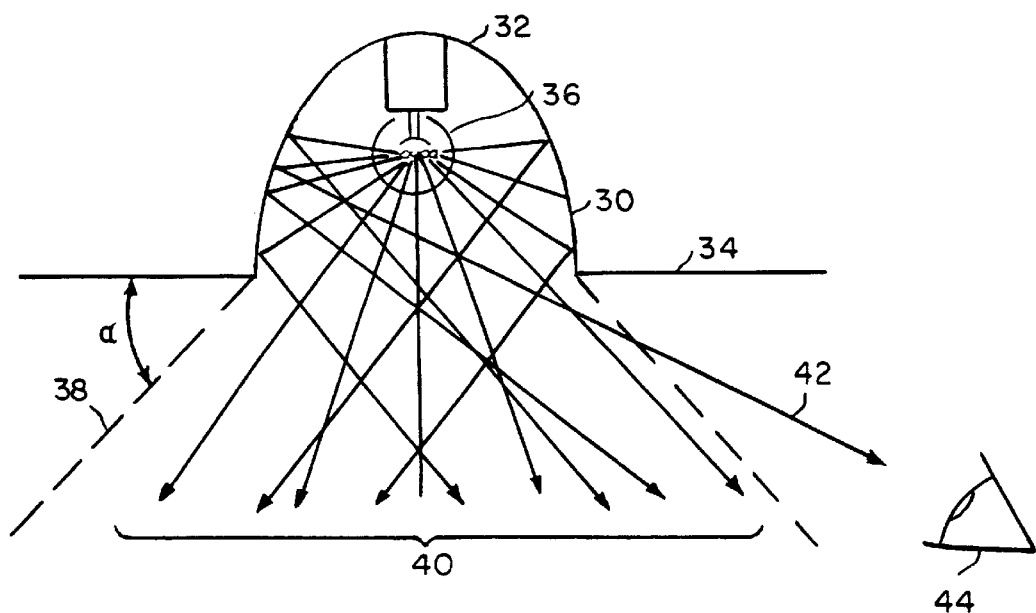
FIG. 1 depicts diagrammatically the geometry of a typical situation in which glare to a viewer from an incandescent recessed lighting fixture can occur.

Referring now to the Drawings, as can be seen in FIG. 1, a typical lamp fixture 32 (shown here as a recessed into a ceiling 34) projects light from a bulb 36 reflector 30 outward in a zone 38 to illuminate a desired area. Although the bulk of the light, as shown by exemplary rays 40, may stay within the desired illumination zone of an angular spread α some light, as shown by exemplary ray 42, can cause glare for an viewer 37.

Figure 2:
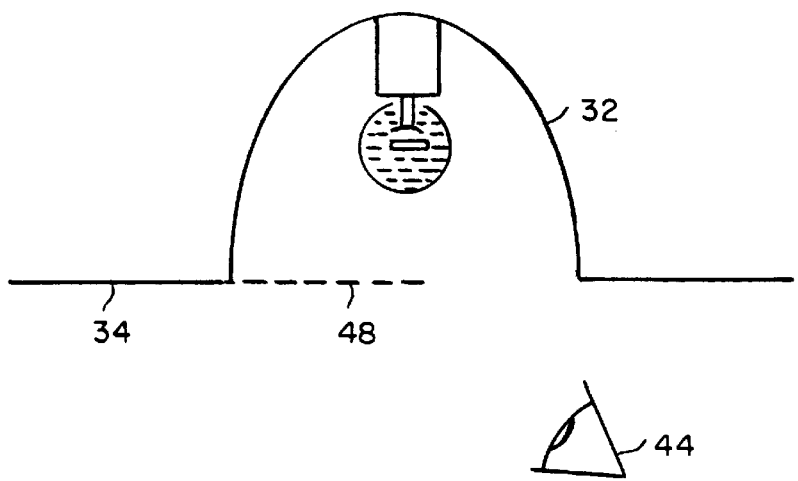
FIG. 2 diagrammatically illustrates how a typical recessed lighting fixture can look like a hole in a ceiling's surface when in the off condition.

As can be seen in FIG. 2, another problem that can occur with a lighting fixture 32 that is recessed into a surface, such as a ceiling 34, is that in the off state, it can look unpleasingly like a hole in the plane of the ceiling 48 to an viewer 37.

Figure 3:
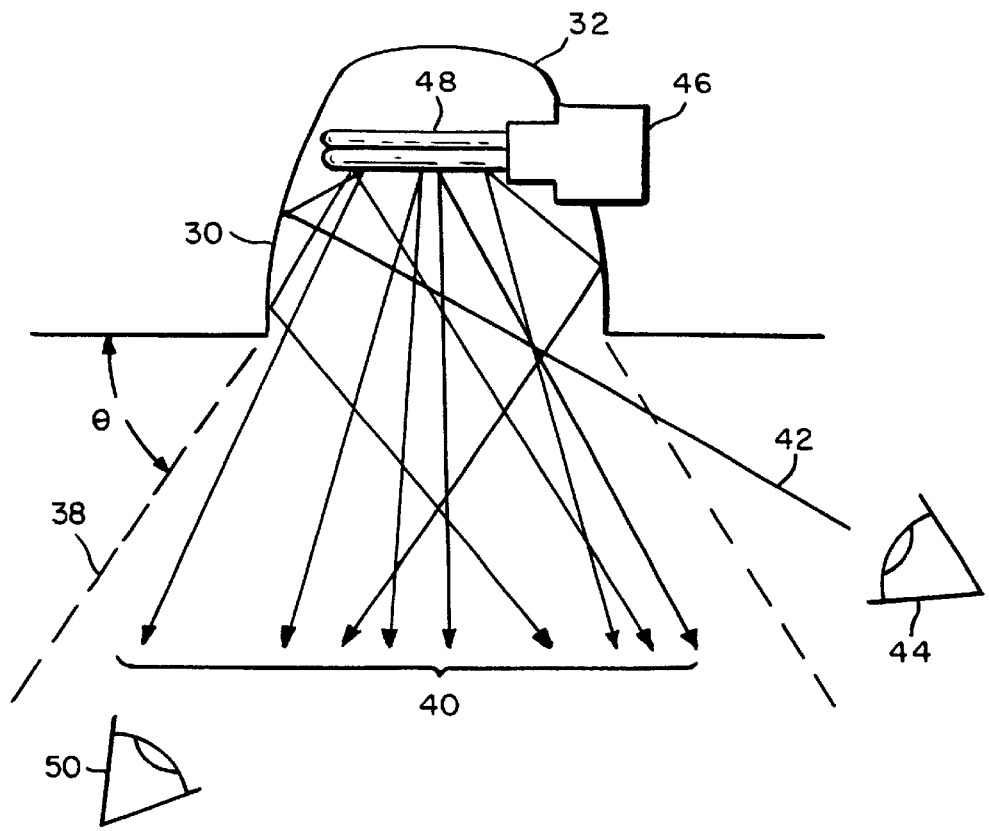
FIG. 3 depicts diagrammatically the geometry of a typical situation where an observer outside the main area of illumination of a typical compact fluorescent recessed lighting fixture can be exposed to glare and also how an observer inside the main area of illumination can easily see the complex and unattractive bulb.

As FIG. 3 illustrates, the aesthetic problems of recessed lights 32 has become worse with the advent of energy efficient compact bulbs 46. The bulbs 46 themselves are often in the form of large, twisted tubes 48 that present an unpleasing aspect to a viewer 50. In addition, the large bulbs 48 are less of a point source than incandescent bulbs and thus require expensive, carefully shaped reflectors 30 to effectively obtain an illumination pattern (as shown by exemplary rays 40) over a desired zone 38 of angle θ. In spite of expensive reflectors 30, such fixtures are often even more prone to glare (as shown by exemplary ray 42 to a viewer 37).

FIG. 4 shows a proposed technique for preventing glare by the use of a grid of tubes 52 positioned in front of a fixture 32. This grid 52 shields a viewer 37 from glare by blocking off-axis light as shown by exemplary ray 42. In addition, when the lighting fixture is in the off state, the grid helps keep the fixture from looking like a hole in the plane of the ceiling. However, the grid also reduces the efficiency of the fixture by blocking light, as shown by exemplary rays 54, that would otherwise be part of the output as shown by exemplary rays 40. Thus the illumination zone 38 is reduced to angle β.

Figure 5:
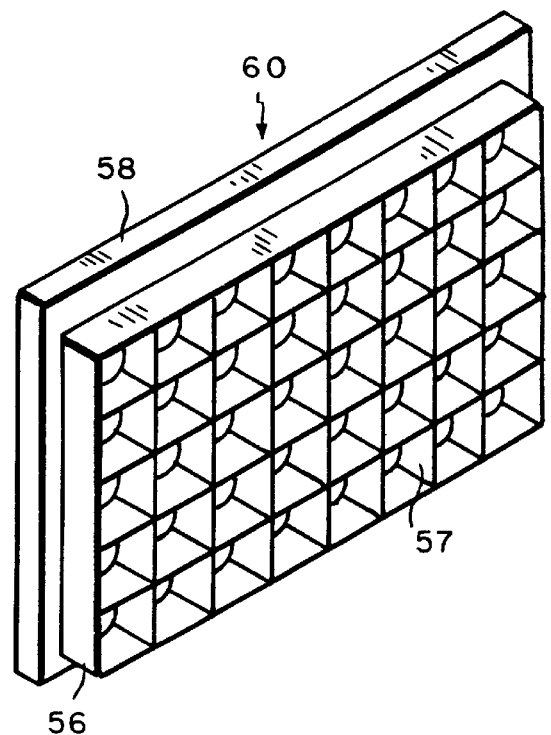
FIG. 5 depicts a particular embodiment of a structure in accordance with the invention for use in improving lighting fixtures.

FIG. 5 shows one preferred embodiment of a structure in accordance with the invention for improving lighting fixtures. As seen therein, a grid of tubes 56 is partially embedded into the a lens plate 58, having a configuration which permits the structure to be attached, in a suitable manner which would be well known to the art, at the front of a lighting fixture 32 (not shown). FIG. 6 shows a section through this embodiment, detailing how the grid of tubes 56 is embedded into the lens material 58 with lenslettes 70, which will be discussed below. FIG. 7 shows how the structure 60 is places n front of fixture 11. Suitable grid of tubes are described herein and have been described in U.S. Pat. No. 4,929,055 and PCT/US93/11459.

Figure 8:
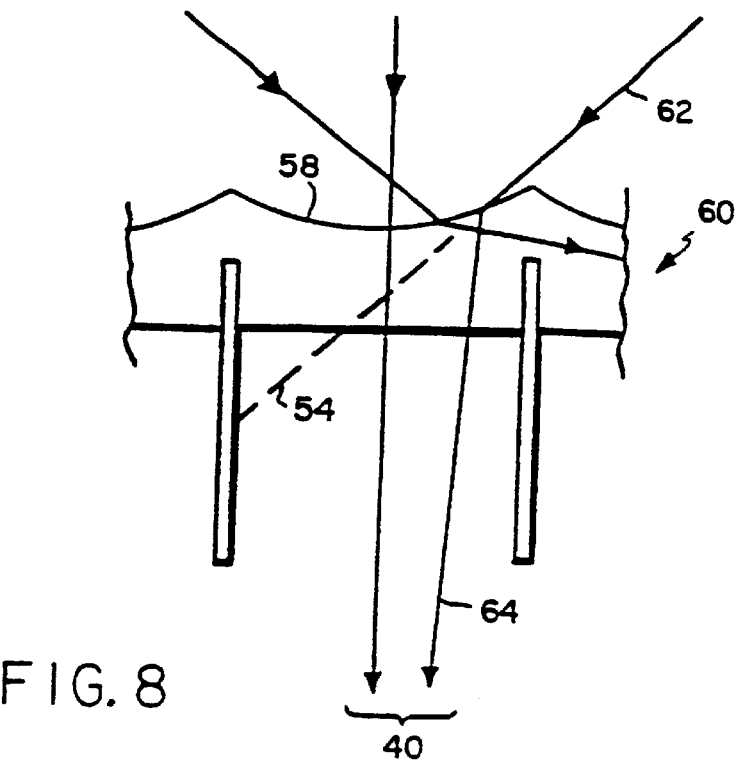
FIG. 8 diagrammatically illustrates how a lens element embedded into a grid of tubes can collect light coming from one side that would normally hit a grid of tubes alone and that with a single grid without lens element would direct this light downwards through the tubes.

As seen in FIG. 8, a section through the structure of one preferred embodiment, by refracting light that strikes it from one side (as shown by exemplary ray 62), a suitable lens plate 58 can direct light that would normally be blocked (as shown by exemplary ray 54) by the grid of tubes 56 downwards through the tubes (as shown by exemplary ray 64), thus increasing the amount of light 40 that is passed out of the lighting fixture.

Figure 9:
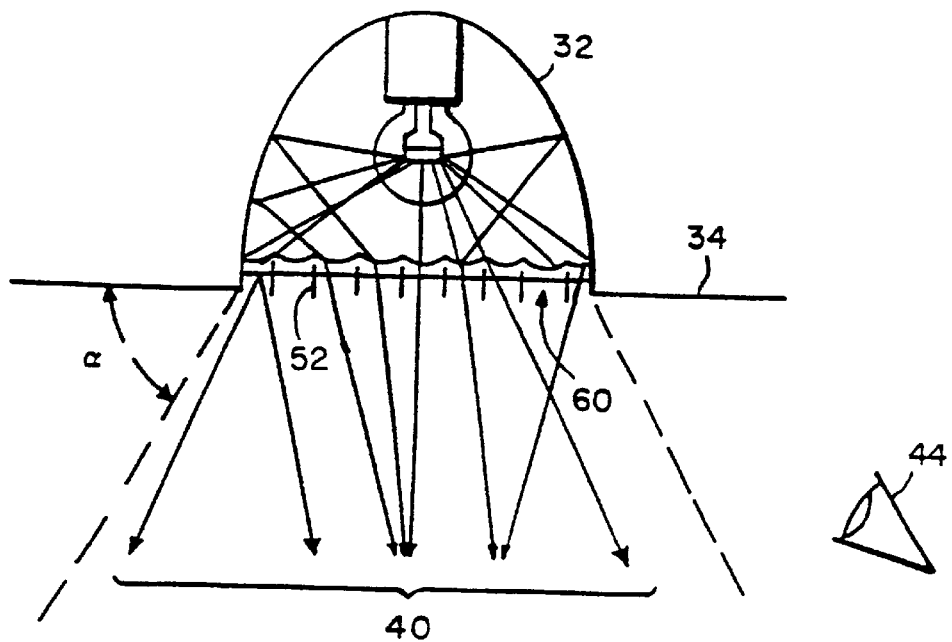
FIG. 9 diagrammatically illustrates how a lens structure embedded with a grid of tubes can widen the angle of illumination of light coming from a fixture while still shielding an observer from a direct view of the interior of the fixture.

Thus, as can be seen in FIG. 9, when a structure of a preferred embodiment 60 is placed in front of a fixture 32, the fixture can maintain the desired illumination zone of an angular spread α that it had without a grid of tubes, as shown in FIG. 1, while at the same time passing a larger amount of light 40 than a fixture 32 (as shown in FIG. 4) with only a grid of tubes 52. Also, the structure 60 will shield a viewer 37 from glare, and when the fixture is in an off condition, the grid of tubes 56 will keep the fixture from looking like a hole in the ceiling 34.

Figure 10:
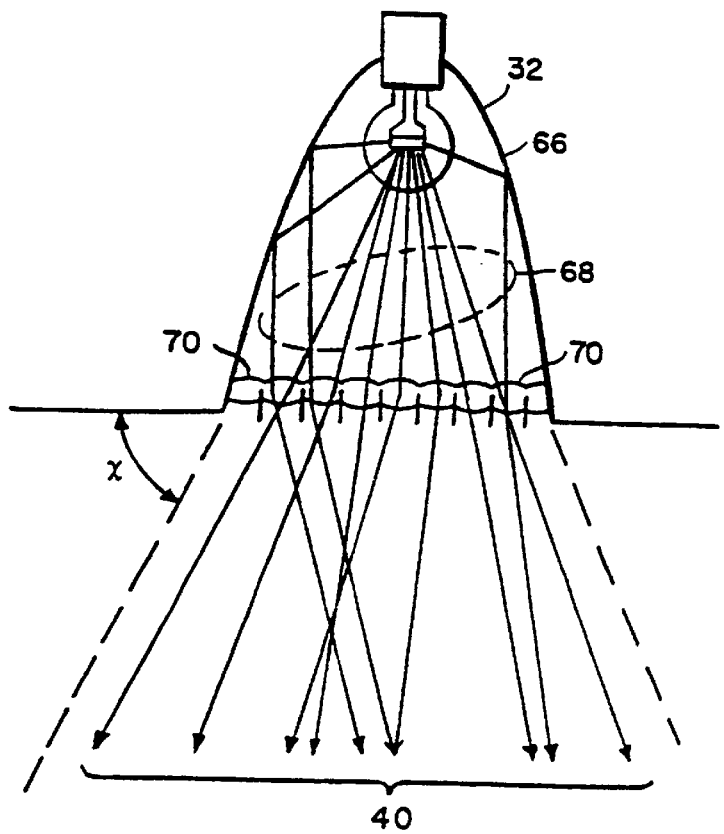
FIG. 10 diagrammatically illustrates how a structure in accordance with the invention can spread essentially collimated light coming from a lighting fixture.

FIG. 10 shows another preferred embodiment of the structure used with a fixture 32 that has a parabolic reflector 66. The light coming from the fixture (as shown by exemplary rays 68) are essentially collimated, and the lenslettes 70 of the lens plate 58 refract this light outward in a spreading pattern (as shown by exemplary rays 40) over an illumination angle.

Figure 11:
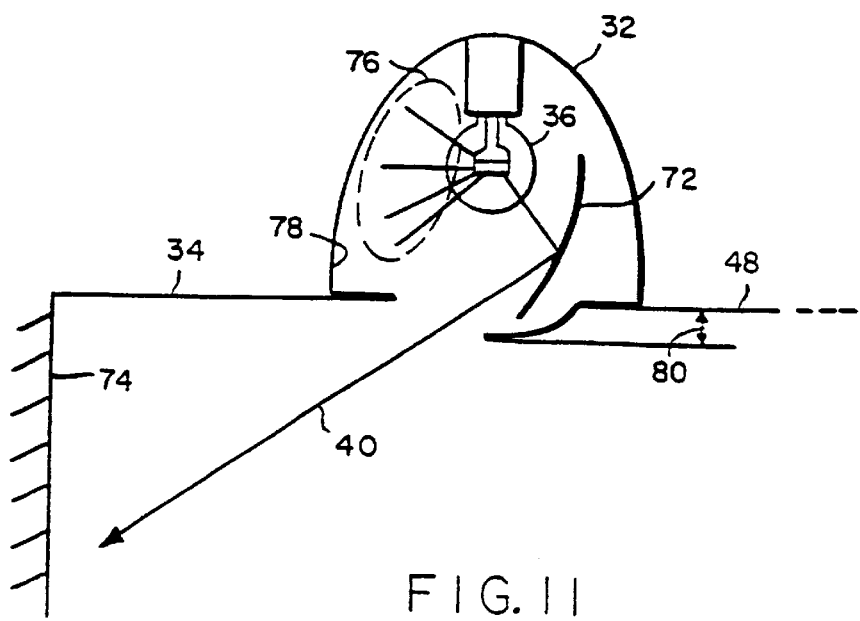
FIG. 11 depicts diagrammatically the geometry of a typical "wall washer" type lighting fixture.

FIG. 11 shows a proposed technique of the prior art for a lighting fixture 32 that functions as a "wall washer." This kind of fixture is generally recessed into a ceiling 34 and uses a small, angled surface 72 to reflect light (as shown by exemplary ray 40) from a bulb 36 onto an adjacent wall 74 to illuminate it. This type of fixture has a number of problems: for example, more than half of the light from the bulb 36 (as shown by exemplary rays 76) are simply absorbed by the inside of the fixture's housing 58 and not projected outward to light the wall 74. Moreover, these fixtures typically physically extend a distance 80 below the plane 82 of the ceiling 34. Furthermore, when in the off state, these fixtures typically look like a hole in the ceiling.

Figure 12:
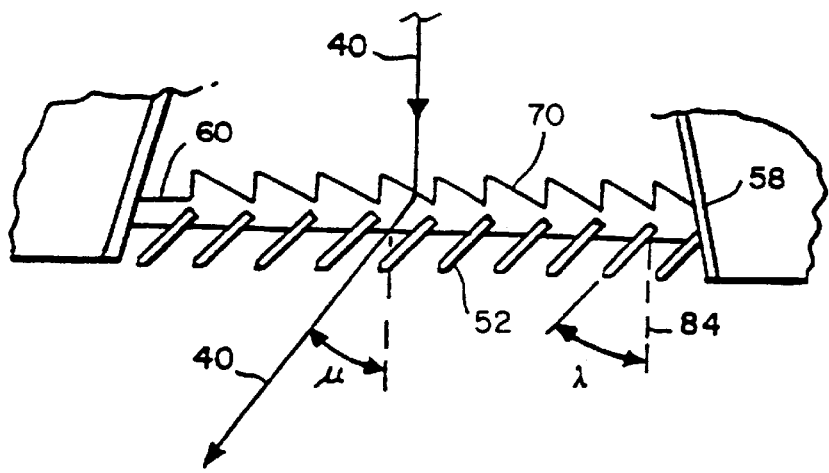
FIG. 12 diagrammatically illustrates how lens elements embedded with a tilted grid of tubes can direct light to "wash a wall" with light, while at the same time shielding the view of an observer from glare or a view of the interior of the fixture.

Another preferred embodiment of the invention can solve these problems with existing "wall washer" type light fixtures. FIG. 12 shows a section of a structure 60 where the grid of tubes 56 is embedded into the lens plate 58 at an angle λ to the axis 84 of the lighting fixture 32. With a suitable lenslette shape 74, which would be well known to the art, essentially collimated light coming from the bulb and reflector (as shown by exemplary ray 40) will be refracted off at an angle $\mu$.

Figure 13:
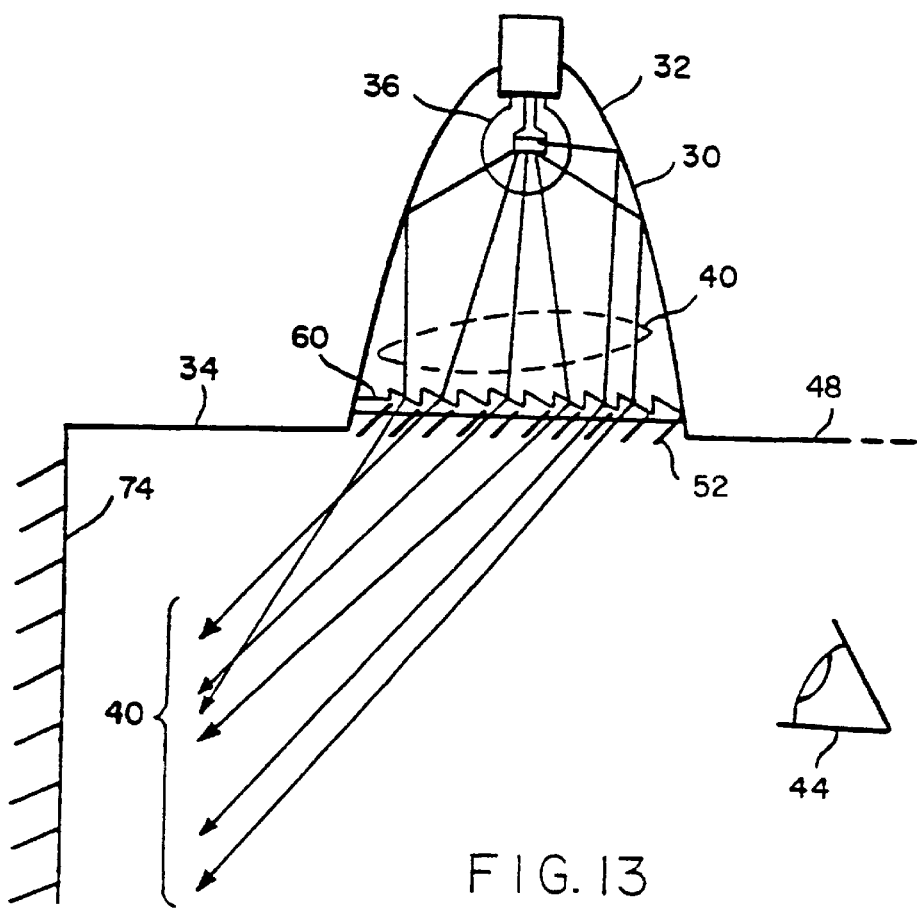
FIG. 13 diagrammatically illustrates how a lighting fixture incorporating a structure in accordance with the invention can wash a wall with light without extending below the ceiling plane, can make the light look like part of the ceiling and can shield a view or from glare.

FIG. 13 shows an overall view of one preferred embodiment of a "wall washer" type lighting fixture 32 in accordance with the invention. The structure 60 is placed at the front of the fixture and takes light coming from the bulb 36 and off the reflector 30 (as shown by exemplary rays 40) and refracts it so that the light 40 is directed at the wall 74. A lighting fixture such as 32 is relatively simple to fabricate, and therefore less expensive than existing "wall washer" type fixtures as shown in FIG. 11. In addition, it should be more efficient than the type of fixture shown in FIG. 11, since a large portion of the light is not simply absorbed by the housing as it is in FIG. 11. Furthermore, because the grid of tubes 56 are at an angle to a viewer 44, the viewer will see the fixture as part of the ceiling plane 82 when the light is in both the on and the off state, and therefore the fixture will not appear as a hole in the ceiling 34.

Figure 14:
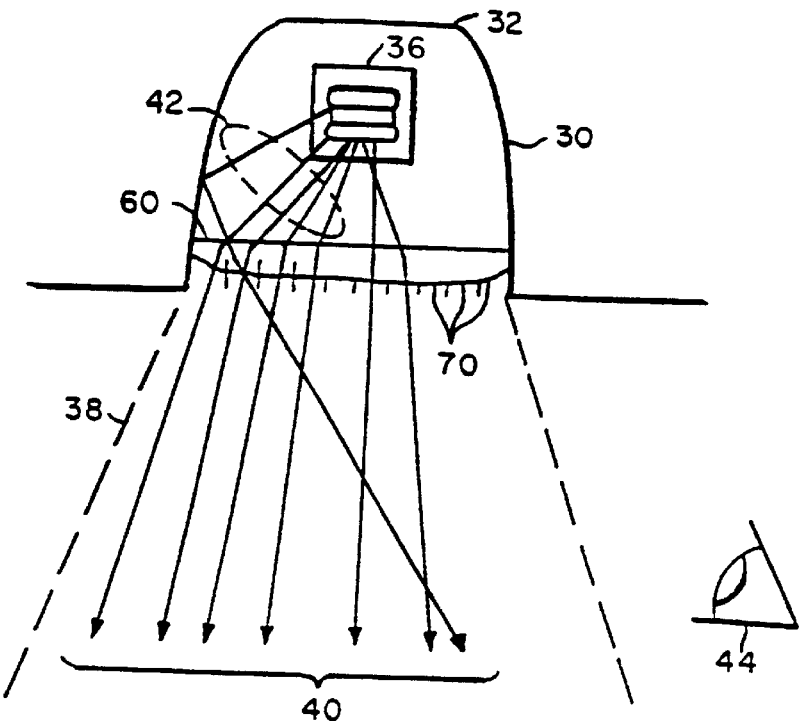
FIG. 14 diagrammatically illustrates, with a section through the long axis of a compact fluorescent bulb fixture with an inexpensive reflector, how a structures in accordance with the invention can help manage the light output of a fixture that does not have an efficient reflector/bulb combination, while at the same time hiding a direct view of the unsightly interior.

With a lighting fixture using an energy efficient compact fluorescent bulb as shown in FIG. 14 (a sectional view perpendicular to the long axis of the bulb 46), one preferred embodiment of a structure 60 in accordance with the invention can be figured such that the lenslettes 70 at the edge of the fixture are shaped such that the light (as shown by exemplary rays 42) coming at an angle from the bulb 46 which lies in the center of tubes, a maximum amount of the light being directed into a preferred illumination zone 38 (as shown by exemplary rays 40). In this way, a less expensive reflector 30 can be used while still maintaining good efficiency. The structure 52 also shields the viewer 44 from an unpleasant direct view of the interior of the fixture when the fixture is in the off or on state.

Figure 15:
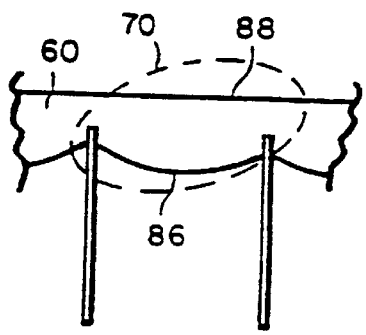
FIG. 15 depicts an alternative embodiment of the lens/tube structure.

In one embodiment of the present invention, as shown in detail in FIG. 15, the lenslettes 70 that make up the structure 60 have a convex outer surface 86 and a planar inner surface 88.

Figure 16:
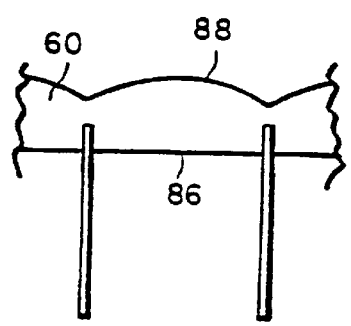
FIGS. 16, 17, 18, and 19 depict still further alternative embodiments of lens/tube structures.

In a further embodiment as shown in detail in FIG. 16, the lenslettes that make up the structure 60 have a planar outer surface 86 and a convex inner surface 88.

Figure 17:
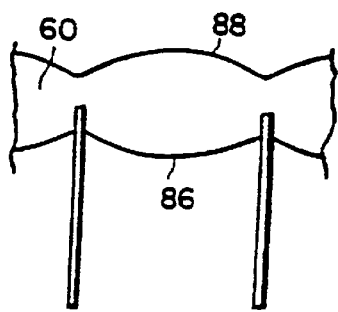

In a further embodiment as shown in detail in FIG. 17, the lenslettes that make up the structure 60 have convex outer 86 and inner 88 surfaces.

Figure 18:
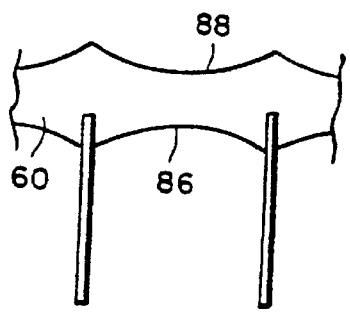

In a further embodiment as shown in detail in FIG. 18, the lenslettes that make up the structure 60 have concave outer 86 and inner 88 surfaces.

Figure 19:
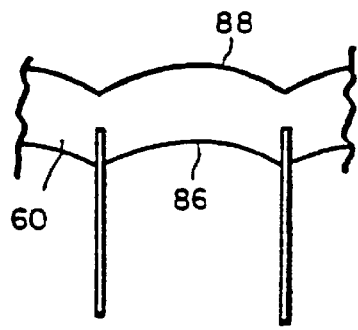

In a further embodiment as shown in detail in FIG. 19, the lenslettes that make up the structure 60 have concave outer 86 and a convex inner 88 surfaces.

Figure 20:
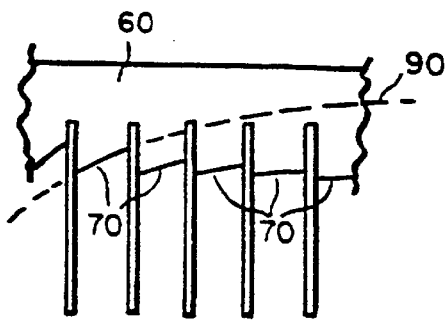
FIG. 20 diagrammatically illustrates how lens elements embedded into a grid of tubes can be stepped in the fashion of a fresnel lens to mimic the effect of a much thicker and more a steeply curved lens.

In yet a further embodiment, FIG. 20 shows a lens structure 60 where the lenslettes 70 are stepped, in the manner of a fresnel lens, so that the lens plate structure 60 can mimic the performance of a much thicker and more steeply curved, lens 90.

Figure 21:
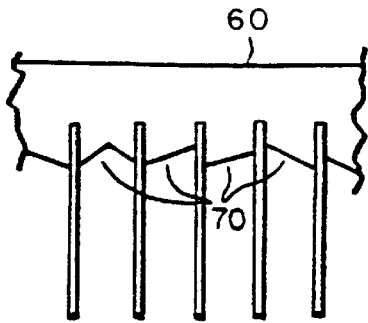
FIG. 21 diagrammatically illustrates how lens elements embedded into a grid of tubes can each have a different purpose than its neighbor.

In a yet a further embodiments, FIG. 21 shows a lens structure 50 where each of the lenslettes 70 can have a different purpose or configuration than its neighbor, to produce varied lighting effects.

Figure 22:
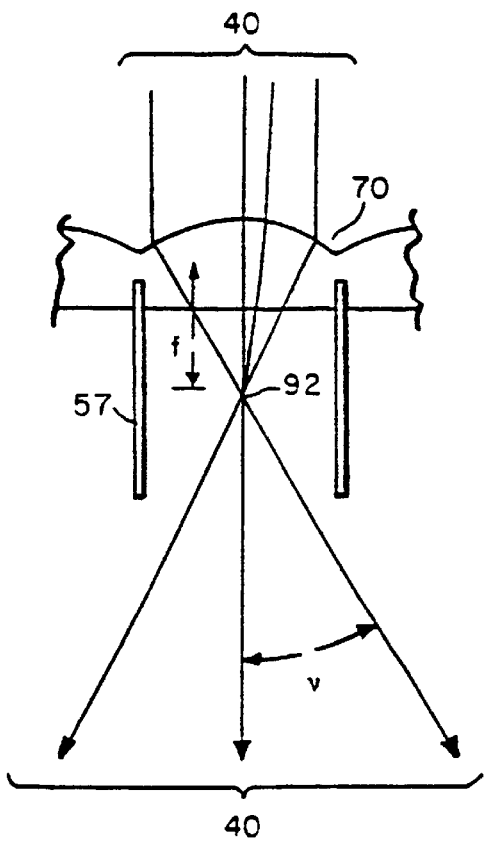
FIG. 22 diagrammatically illustrates how lens elements embedded into a grid of tubes can spread essentially collimated light to illuminate a wider angle without having large amounts of the light blocked by the tubes.

As seen in FIG. 22, a section through the structure of yet another embodiment, the lenslette 70 has a short focal length f such that light coming from the bulb and reflector of the fixture (as shown by exemplary rays 40) in an essentially collimated manner can be brought to a focal point 92 inside the embedded tube 56 and then made to spread out widely (as shown by exemplary rays 40). In this way the structure 60 can shield the view of the inside of the fixture 32 and also keep the fixture 32 from looking like a hole when it is in the off state, while still giving the fixture 32 a wide angle of illumination υ.

As used herein, the term grid of tubes is deemed to mean an element of generally tubular configuration having any selected geometrical cross-sectional shape.

Thus, the tubular elements 57 in FIG. 5 are shown as being square in cross-section, although other shapes can be used, e.g., other rectangular configurations, a triangular configuration, a hexagonal configuration, etc., such elements capable of being suitably nested to form a substantially uniform honeycomb or grid-like overall structure. Suitable grid of tubes or tubular elements are also disclosed in U.S. Pat. No. 4,929,055 and PCT/US93/11459, both incorporated herein by reference. Also, references herein to a grid of tubes or tubular elements being partially embedded in a lens indicate that the tubular elements extend to within the lens substrate as exemplified in FIG. 26, rather than merely abutting the lens surface.

Figure 23:
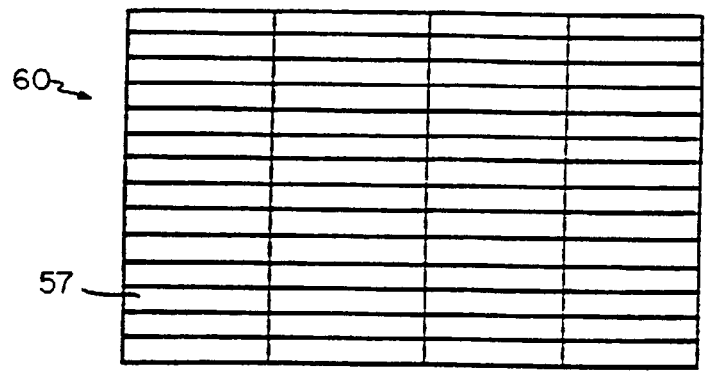
FIG. 23 depicts an alternative embodiment for the gathering of the tubes into a grid.
Figure 24:
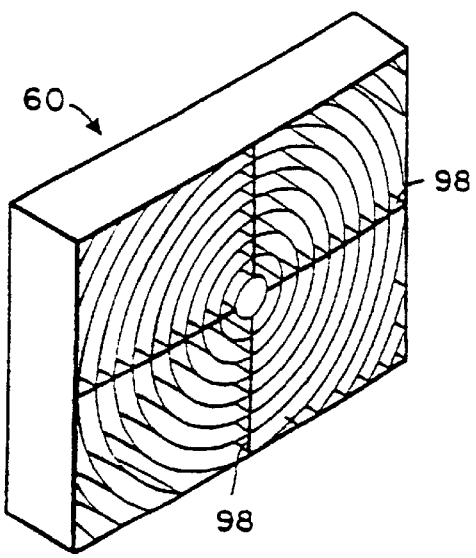
FIGS. 24 and 25 depict still further alternative embodiments for the gathering of the tubes into a grid.
Figure 25:
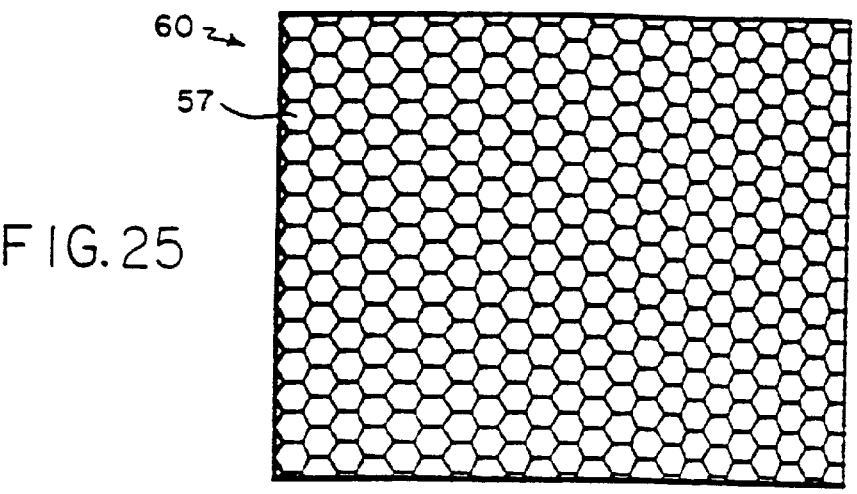

The tubes that make up the grid 56 can have a number of different configurations, though the cross sectional shape of the tubes would generally be selected to that they could be nested into a honeycomb type arrangement. FIG. 23 shows another preferred embodiment of a tubular grid structure 56 with tubes of a rectangular cross section 96. In yet another embodiment, FIG. 24 shows a structure 60 within an arrangement of concentric tubes 57 held in position by horizontal and vertical vanes 98. In yet another embodiment, FIG. 25 shows a structure 60 with tubes 57 of a hexagonal cross section.

Figure 26:
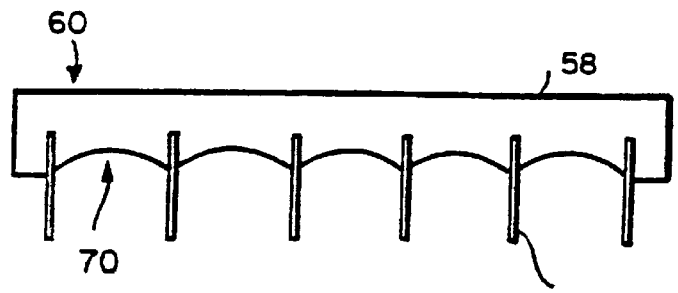
FIGS. 26, 27 and 28 are useful in explaining the concept of preforming the shape of lens structure so that when a grid of tubes is pressed into it, material flowing away from the tube walls will form the desired final lens shape.

One method of embedding the grid of tubes 56 into the lens plate 58 would be to heat the lens plate 58 to its state-change temperature (Tg) and then pressing the grid of tubes 56 into the lens. The problem with this method when seeking to form lenses is that the material displaced by the encroaching grid 56 can deform the pre-molded lenslette shapes on the lens plate. FIG. 26 shows, a desired final form of a structure 60 incorporates a lens plate 58 with an embedded grid 56 the lenslette 70 having the desired final form.

Figure 27:
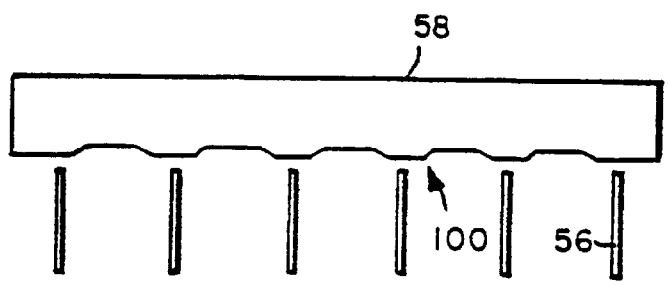
Figure 28:
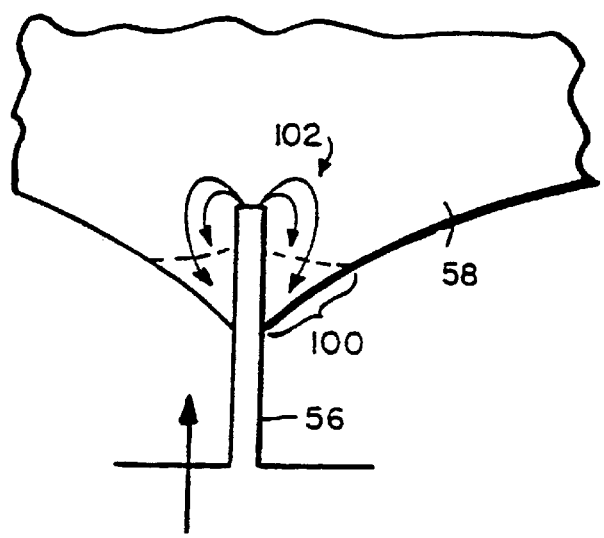

According to an example manufacturing method of the invention, as exemplified in FIG. 27 when there is a lens plate 58 that is to have a grid of tubes 56 embedded into it, the lenslettes 70 can be formed with a lenslette shape 100 such that when, as shown in FIG. 28, a grid 56 is pushed into the lens plate 58 heated to its glass transition temperature (Tg) or somewhat in excess thereof, the material displaced 102 by the grid will flow back and fill in the designed final form of the lenslette shape 100.

Figure 29:
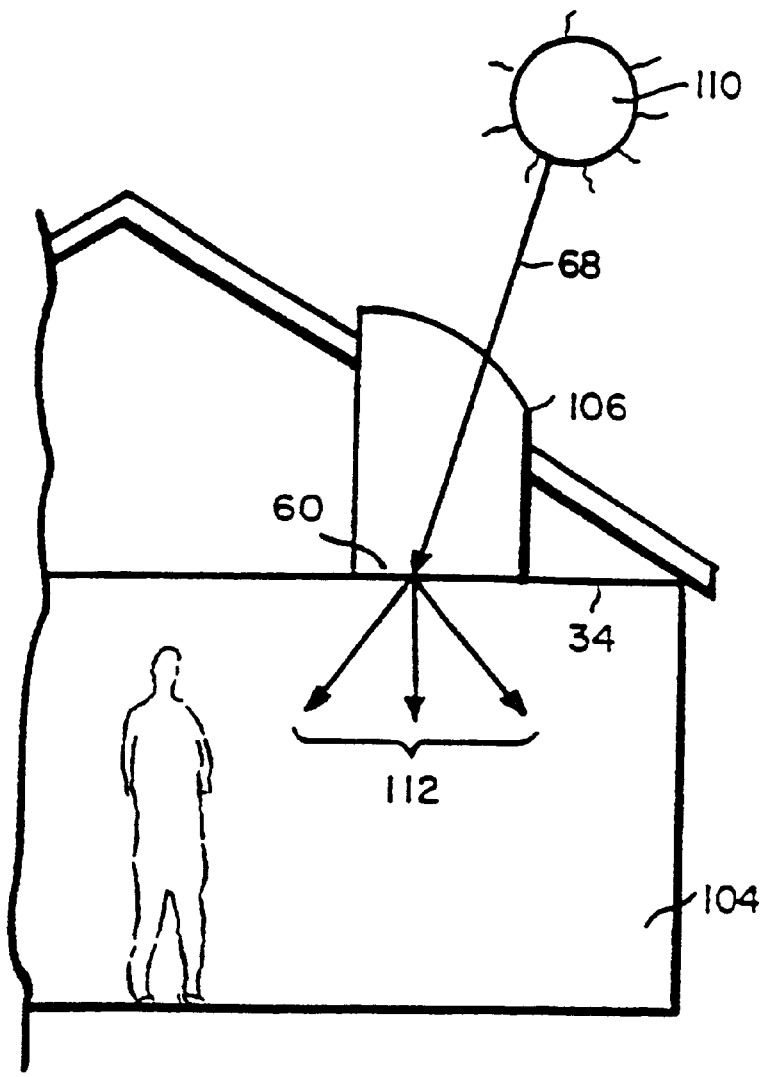
FIG. 29 depicts a still further embodiment for use with a skylight in accordance with the present invention.

The structure 60 also can be placed in a ceiling 34 as shown for example in FIG. 29. In that Figure, room 104 is below a skylight 106 (a type of lighting fixture). During the night, when a skylight normally looks black or dark, the structure 60 will look light and essentially part of the ceiling. During the day, light rays 108 from the sun 110 can be spread through a wider angle of rays 112 to make a light source that will be more pleasing and more evenly illuminate a room 104 than an unmodified skylight would.

Structures in accordance with the invention can be relatively easily fabricated for use on many different types of lighting fixtures. In addition to interior architectural lighting applications such as residential or commercial buildings, the lighting fixtures of the invention can be used in theatrical lighting or the like.

Other modifications of the invention will occur to those in the art within the spirit and scope of the invention. Hence, the invention is not to be considered as limited to the particular embodiments discussed and shown in the figures, except as defined by the appended claims.

What is claimed is:

1. An architectural light transmitting device comprising:
   a light transmitting lens positioned in front of a light source and having a substantially non-opaque front surface and a light receiving rear surface and having at least one lens or prism elements, light received from said light source being transmitted substantially through the non-opaque front surface of said light transmitting lens;
   an array of substantially tubular elements proximate to said substantially non-opaque front surface of the lens whereby, when said light source is not operative, said front surface of the light device appears as a substantially opaque surface.

2. The architectural light transmitting device of claim 1 wherein said light source is a skylight.

3. The architectural light transmitting device of claim 1 wherein the device is adapted for use in the interior of a residential or a commercial building.

4. The architectural light transmitting device of claim 3 wherein the device is adapted to be positioned proximate a wall and to illuminate said wall.

5. The architectural light transmitting device of claim 1 wherein the device further comprises a reflective surface associated with said light source for projecting light from said light source to said rear surface of said light transmitting lens and outwardly through said light transmitting lens.

6. The architectural light transmitting device of claim 2 wherein said light source includes a light bulb.

7. The architectural light transmitting device of claim 5 wherein said light source is a high-efficiency light bulb.

8. A method for producing an architectural light transmitting device comprising:
   heating a lens material to at least its glass transition temperature;
   at least partially embedding an array of substantially tubular elements into said heated lens material; and
   cooling said lens material with substantially tubular elements embedded therein whereby lens elements form around and/or between the tubular elements.

9. The method of claim 8 further including the step of:
   before the step of heating a lens material to its glass transition temperature, the step of forming said lens material with a predetermined shape, whereupon the step of at least partially embedding an array of substantially tubular elements, said lens material will displace and form into a plurality of lens elements.

* * * * *